2,966,495
Patented Dec. 27, 1960

2,966,495

PRODUCTION OF N,N'-BIS-(THIOCARBAMYL)-HYDRAZINE AND 2 - AMINO - 5 - MERCAPTO-1,3,4-THIADIAZOLE

John Song, North Plainfield, and Gilmer Trower Fitchett, Plainfield, N.J., assignors to American Cyanamid Company, New York, N.Y., a corporation of Maine No Drawing. Filed Oct. 27, 1955, Ser. No. 543,281

7 Claims. (Cl. 260—306.8)

This invention relates to a process for the preparation of N,N'-bis-(thiocarbamyl)-hydrazine, and to its conversion to 2-amino-5-mercapto-1,3,4-thiadiazole. More particularly, it relates to an improved process for the preparation of N,N'-bis-(thiocarbamyl)-hydrazine by the reaction of hydrazine sulfate with a thiocyanate salt, and conversion to 2-amino-5-mercapto-1,3,4-thiadiazole in the presence of hydrochloric acid.

N,N'-bis-(thiocarbamyl)-hydrazine is a useful intermediate for the preparation of other chemicals. It is particularly useful as an intermediate to be cyclized to form 2 - amino - 5 - mercapto-1,3,4-thiadiazole. Among products which may be formed therefrom are certain products claimed in U.S. Patent 2,554,816 including 2 - acetylamino - 1,3,4 - thiadiazole - 5 - sulfonamide. 2-acetylamino-1,3,5-thiadiazole-5-sulfonamide may be produced by the treatment of hydrazine with a thiocyanate to form N,N'-bis-(thiocarbamyl)-hydrazine, cyclizing the N,N'-bis-(thiocarbamyl)-hydrazine to form 2-amino-5-mercapto-1,3,4-thiadiazole, acylating to 2-acetylamino - 5 - mercapto - 1,3,4 - thiadiazole, oxidizing and chlorinating to 2-acetylamino-1,3,4-thiadiazole-5-sulfonyl chloride which on treatment with ammonia gives 2-acetylamino-1,3,4-thiadiazole-5-sulfonamide. The reactions may be summarized as:

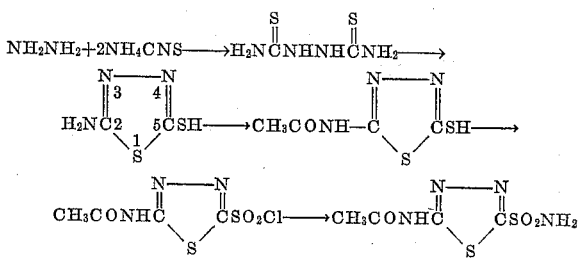

Inasmuch as 2-acetylamino-1,3,4-thiadiazole and related products have shown remarkable therapeutic utility as diuretics and have been found useful in glaucoma and epilepsy, it is obviously desirable that such products be made available at a low cost. With five steps involved, low yields in any of the steps markedly increase the cost of production. Accordingly, increases in yield by improving the efficiency of any of the steps individually, collectively, or by otherwise modifying the synthesis is greatly in the public interest.

The chemistry involved is considerably complicated by the fact the tautomers and polymorphism exist in at least some several of the intermediates. For example, L. L. Bambas, The Chemistry of Heterocyclic Compounds, Interscience Publishers, Inc., N.Y., 1952, at page 149 lists three reported forms of 2-amino-5-mercapto-1,3,4-thiadiazole and two reported forms of N,N'-bis-(thiocarbamyl)-hydrazine, the chemical reactions of which are reported as identical. While the reactions may be identical, the various forms may play a part in determining competitive reactions and affect the yields.

N,N'-bis-(thiocarbamyl)-hydrazine has been produced from hydrazine sulfate. A patent to Swimmer, U.S. 2,710,243 entitled, Preparation of Thiosemicarbazide and Isomers Thereof, discloses the reaction of hydrazine sulfate and alkali metal thiocyanates under conditions which yield hydrazine thiocyanate and its isomer thiosemicarbazide. Specifically, this patent discloses the use of dihydrazine sulfate, also called hydrazine hemisulfate, to secure yields of the thiosemicarbazide rather than N,N'-bis(thiocarbamyl)-hydrazine but mentions that N,N'-bis-(thiocarbamyl)-hydrazine may be obtained. This patent refers to N,N'-bis(thiocarbamyl)-hydrazine by the name 1,2-di-(thiocarbamyl)-hydrazine. The Bambas book sometimes uses the synonym bithiourea. The nomenclature in this field is in a formative stage and different authorities prefer different systems of nomenclature.

The situation is also complicated by the fact that the reactions are sensitive to the presence of small amounts of impurities and erratic results may be obtained, depending upon the sources of the starting materials. From an academic viewpoint using pure materials under controlled conditions, certain reactions give certain results, but in commercial operation with commercial grades of chemicals less satisfactory results are obtained. Also it is desirable from a commercial standpoint to obtain products of comparatively high purity which products do not require subsequent purification before being utilized for the next steps. It is convenient, for example, to be able to use a chemical compound directly as obtained by crystallization, from one step, in the wet form, in the next step, to avoid purification drying and storage problems.

We have discovered certain improvements in a method for preparing N,N'-bis-(thiocarbamyl)-hydrazine, which result in a high yield of a product of high purity, and which product is in a form particularly adaptable for immediate conversion to 2-amino-5-mercapto-1,3,4-thiadiazole.

In the preparation of N,N'-bis-(thiocarbamyl)-hydrazine from hydrazine sulfate, by partly neutralizing with an alkali metal hydroxide before the addition of ammonium or alkali metal thiocyanate, and causing the thiocyanate to react while hot, and then partially cooling, acidifying and heating again, high yields of N,N'-bis-(thiocarbamyl)hydrazine are obtained as a very pure product.

The addition of hypophosphorous acid to the reaction mixture during the acidification further increases the efficiency of the process. The N,N'-bis-(thiocarbamy)-hydrazine may be converted to 2-amino-5-mercapto-1,3,4-thiadiazole by heating in an aqueous hydrohalic acid, preferably hydrochloric acid.

The conversion of the N,N'-bis-(thiocarbamyl)-hydrazine to 2-amino-5-mercapto-1,3,4-thiadiazole is favored by hydrochloric acid, and the step of ring closure may be performed without isolation of the N,N'-bis-(thiocarbamyl)-hydrazine, and may be partially combined with it.

For commercial operations, to an aqueous slurry of hydrazine sulfate is added ¼ to 1 mol, preferably from ⅓ to ½ mol of an alkali metal hydroxide. Sodium or potassium hydroxides are most economically used as they are very cheap and completely satisfactory. This mixture is heated to between about 90° C. and the boiling point, preferably above 100° C., and the thiocyanate is added. Two mols react per mol of hydrazine. Other thiocyanates may be used, such as sodium thiocyanate or potassium thiocyanate or other soluble alkali or alkaline earth thiocyanates, but ammonium thiocyanate is economically obtainable and because it is a salt of a volatile and soluble base, it is particularly convenient.

The hot mixture is cooled below 100° C., and then is added sufficient of a mineral acid to neutralize the added hydroxide, and lower the pH to favor the production of N,N'-bis-(thiocarbamyl)-hydrazine. Preferably an excess is added which is about equivalent to the amount added to neutralize the added hydroxide. With sulfuric acid, which is the cheapest and preferred acid, about as many mols are used as mols of hydroxide, namely from ¼ to 1 mol, preferably from ⅓ to ½ mol. With other than glass-lined reaction vessels it is particularly desirable that the temperature be below 100° C. during the addition of the acid. The solution is reheated, preferably between 100° C. and the boiling point, held until reaction is complete, the mixture cooled, and the N.N'-bis-(thiocarbamyl)-hydrazine separated, and washed with water. Reaction temperatures as high as reflux conditions may conveniently be used without requirement of the use of pressure vessels. Conveniently, a temperature of around 102 to 115° C. gives high yields of excellent quality.

From 0.5 to 5 parts of hypophosphorous acid per 100 parts of hydrazine sulfate improves the yields obtained. The hypophosphorus acid may be added as a 50% solution. From 1½ to 2 parts of 50% hypophosphorus acid per 100 parts of hydrazine sulfate is the most economical operating range with the current chemical price structure.

The aqueous mixture, after reaction is completed, may be drowned in water and the N,N'-bis-(thiocarbamyl)-hydrazine separated by filtration, and washing with water. The thus separated and washed N,N'-bis-(thiocarbamyl)-hydrazine or the concentrated solution containing the N,N'-bis-(thiocarbamyl)-hydrazine may be adjusted to a concentration of between about 1- and 12-normal with hydrochloric acid. In the presence of hydrochloric acid N,N'-bis-(thiocarbamyl)-hydrazine cyclizes to form 2-amino-5-mercapto-1,3,4-thiadiazole. A hydrohalic acid is required for cyclization, as sulfuric acid does not cause cyclization. Accordingly, for the isolation of the N,N'-bis-(thiocarbamyl)-hydrazine, sulfuric acid s preferable for the acidification step, but if simultaneous conversion is desired, hydrochloric acid may be used throughout. By separating the N,N-bis-(thiocarbamyl)-hydrazine, before the cyclization step, certain impurities which might later interfere are conveniently discarded.

As illustrative of our invention, but not by way of limitation, the following specific examples are set forth. Parts are by weight, unless otherwise specified.

EXAMPLE 1

A cold mixture of 27 parts of 50% sodium hydroxide solution and 125 parts of water, is stirred and to the mixture is added 154 parts by weight of hydrazine sulfate. To the mixture is added 2.5 parts of a 50% solution of hypophosphorous acid, and the mixture then heated to 100° C. To the hot solution at this temperature is added 208 parts of ammonium thiocyanate. The mixture is cooled to 95° C. and while maintaining a temperature below 100° C., a mixture of water and 50 parts of concentrated sulfuric acid is added gradually. The mixture is reheated to reflux and stirred for 3½ hours until the reaction is complete. The reaction mixture is then drowned in 500 parts of cold water. From the drowned reaction mixture N,N' - bis - (thiocarbamyl) - hydrazine promptly precipitates. The reaction mixture is filtered, washed with water and dried at 50° C. 142.5 parts of N,N'-bis-(thiocarbamyl)-hydrazine are obtained, which amounts to 80.1% of the theoretical yield. By ultraviolet analysis, the product is 99.2% pure. The melting point of the product is approximately 203° C. For this product, the ultra-violet spectra is a much better criteria of purity than is the melting point.

EXAMPLE 2

To a mixture of 47.4 parts of 50% aqueous sodium hydroxide solution and 125 parts of water is added 154 parts of hydrazine sulfate. After heating to a temperature of about 100° C., 208 parts of ammonium thiocyanate is added gradually. The temperature is then dropped to 95° C. and 78.5 parts of 96% sulfuric acid (sp. gr. 1.84) diluted with 100 parts of water is added gradually to the reaction mixture. The reaction mixture is then heated with stirring at a temperature of about 112° C. to 115° C. until the reaction is substantially complete, and then drowned in 400 parts of water. After cooling to room temperature, the product is removed by filtration, washed with water and dried at about 40° C. A 74.5% yield (132.5 parts) of high quality N,N'-bis-(thiocarbamyl)-hydrazine is obtained, which appears to be 100% pure by ultra-violet analysis.

EXAMPLE 3

To a mixture of 47 parts of 50% aqueous sodium hydroxide solution and 125 parts of ice is added 154 parts of hydrazine sulfate. The mixture is heated to 100° C. and 208 parts of ammonium thiocyanate is then added slowly. The temperature is then dropped to about 95° C. and 63 parts of 96% sulfuric acid (sp. gr. 1.84) diluted with 60 parts of water is added very slowly. The whole mixture is then heated at 112° C. to 116° C. until the reaction is substantially complete and it is then drowned in 400 parts of water and allowed to cool to room temperature. The crystalline product which forms is removed by filtration, washed with water and dried. A 72% yield (128 parts) of N,N'-bis-(thiocarbamyl)-hydrazine is obtained, which by ultra-violet analysis is 99.6% pure.

EXAMPLE 4

A slurry of 154 parts of hydrazine sulfate and 185 parts of water is heated to a temperature of 95° C. There is then added, gradually, 235 parts of ammonium thiocyanate and the reaction mixture is then heated to a temperature of about 110° C. to 114° C., where complete solution occurs. Diluted sulfuric acid, prepared from 36.8 parts of 96% acid and 40 parts of water, is then added, gradually, at a temperature of about 95° C. The reaction mixture is then heated at 112° C. to 114° C. until the reaction is substantially complete. It is then drowned in 250 parts of water and cooled to room temperature. The product is removed by filtration, washed with water, and dried at 50° C. A 64% yield (114 parts) of N,N'-bis-(thiocarbamyl)-hydrazine results, which analyzed 98.8% pure.

EXAMPLE 5

288 grams of hydrazine sulfate is added to a cold mixture of 44.8 milliliters of 50% sodium hydroxide and 200 grams of ice. To the slurry is added 3 milliliters of 50% hypophosphorus acid and 0.6 milliliter of a commercial 25% solution of sodium di-(2-ethylhexyl)sulfosuccinate. The pH of this slurry, measured at 25° C. is 2.3. When the slurry is heated to 94° C., the pH measured hot by using a glass electrode and a portion of a hot mixture is 1.9. The mixture cools to about 80° C. before the measurement can be obtained, and accordingly, a pH meter adjusted at 80° C. against a standard buffer solution is used. To the hot slurry at or near reflux is added a hot solution of 355 grams of ammonium thiocyanate dissolved in 118 grams of water, over a period of 19 minutes. The pH of the hot ammonium thiocyanate solution is 4.0. After all of the ammonium thiocyanate is charged to the reaction mixture the slurry has a pH of 1.0. 10 minutes later complete solution occurs, and crystals of the product begin to appear, the pH is 1.0. After another 17 minutes the pH rises to 1.6. Over a period of 11 minutes and at a temperature of not exceeding 100° C., 52.8 milliliters of 96% sulfuric acid diluted with 28.6 grams of ice are added to the slurry. After the addition of the sulfuric acid the pH is 0.63. The slurry is heated at reflux for 4½ hours, cooled and filtered. The N,N'-bis-(thiocarbamyl)-hydrazine is washed with water until the wash liquor gives no spot on Congo red test paper. 260.4 grams of N,N'-bis-(thiocarbamyl)-hydrazine is obtained which has a purity of 99.0% by ultra-violet analysis.

EXAMPLE 6

10 parts of N,N'-bis-(thiocarbamyl)-hydrazine from Example 1 is added to a solution of 50 parts of concentrated hydrochloric acid and 150 parts of water heated to a temperature of approximately 98° C., and the mixture is heated at 100° C. to 104° C. until the reaction is substantially complete. The whole is then cooled to room temperature and the crystals of 2-amino-5-mercapto-1,3,4-thiadiazole are removed by filtration and washed with water.

EXAMPLE 7

The procedure of Example 6 is followed, except that 50 parts of water are used with the hydrochloric acid instead of 150 parts of water.

EXAMPLE 8

Conventional method 2620 parts of water and 1800 parts of hydrazine sulfate are mixed together, and heated to a temperature between 98 and 102° C. At this temperature 2320 parts of ammonium thiocyanate are added. The temperature is maintained for an additional 30 minutes. Then the mixture is heated to reflux and held at reflux for 3 hours. The mixture is cooled to between 20 and 25° C. The thus formed N,N'-bis(thiocarbamyl)-hydrazine is separated from the mother liquor, washed and dried. A yield is obtained of 1298 parts of N,N'-bis-(thiocarbamyl)-hydrazine which analyzes 98.3% pure by ultraviolet analysis, which is a yield of 61.5% of theoretical.

EXAMPLE 9

2-amino-5-mercapto-1,3,4-thiadiazole from conventional N,N'-bis-(thiocarbamyl)-hydrazine 40.75 parts of N,N'-bis-(thiocarbamyl)-hydrazine from Example 8 are added to a mixture of 230 parts by volume of concentrated hydrochloric acid and 50 parts by volume of 0.5 hypophosphorous acid diluted to 800 parts by volume, at a temperature between 83 and 84° C. The mixture is then brought to reflux over a period of about 20 minutes and refluxed for 4½ hours. The hot mixture is cooled to 25° C. and the thus formed 2-amino-5-mercapto-1,3,4-thiadiazole removed by filtration, washed with 400 parts of water, and dried. A yield is obtained of 15 parts of 2-amino-5-mercapto-1,3,4-thiadiazole which by ultraviolet analysis shows a purity of 96.4% giving a real yield of 40.6%.

EXAMPLE 10

New method

In accordance with the present invention, 1435 grams of hydrazine sulfate are added to a cold aqueous mixture containing 216 milliliters of 50% sodium hydroxide diluted to 850 milliliters with water, 15 milliliters of 50% hypophosphorous acid, and 3 milliliters of 25% sodium di-(2-ethylhexyl)-sulfosuccinate and the slurry warmed to 85° C. A hot aqueous solution at the same temperature containing 1710 grams of ammonium thiocyanate in 570 milliliters of water is added over a period of about 15 minutes while maintaining an 85 to 90° C. temperature. The composition is heated to 112° C. over a period of 27 minutes, and thereto is added 255 milliliters of concentrated sulfuric acid diluted to 560 milliliters with water over a period of 28 minutes while maintaining a temperature of 111° C. (This reaction is conducted in a glass vessel). The reaction mixture is allowed to reflux for 3½ hours, and the hot mixture has added thereto one liter of water. The mixture is cooled at 25° C. and the thus formed N,N'-bis-(thiocarbamyl)-hydrazine is separated by filtration, washed with 12 liters of water and dried at 50° C. A yield of 1269 grams is obtained with a purity of 99.5% representing a real yield of 78.5%.

EXAMPLE 11

2-amino-5-mercapto-1,3,4-thiadiazole from new N,N'-bis-(thiocarbamyl)-hydrazine Example 9 is repeated using 40.2 parts of N,N'-bis-(thiocarbamyl)-hydrazine from Example 10. The reaction is run under conditions identical with Example 9. There is obtained a yield of 28.3 parts of 2-amino-5-mercapto-1,3,4-thiadiazole having a purity of 99%. This represents a yield of 79%. The increased yield is due to the superior quality for this purpose of the N,N'-bis-(thiocarbamyl)-hydrazine produced by the process of this invention.

We claim:

1. A process for the production of N,N'-bis-(thiocarbamyl)-hydrazine which comprises admixing an alkali metal hydroxide with an aqueous slurry of hydrazine sulfate, adding at least a stoichiometric amount of a soluble thiocyanate selected from the group consisting of ammonium thiocyanate, sodium thiocyanate, and potassium thiocyanate, then adding at least about one mol of sulfuric acid per mol of said alkali metal hydroxide and separating the thus formed N,N'-bis-(thiocarbamyl)-hydrazine.

2. The process of claim 1 in which the alkali metal hydroxide is added in the proportion of ¼ to 1 mol per mol of hydrazine sulfate.

3. The process of claim 2 in which the reaction mixture is heated above 100° C. both before and after the addition of the sulfuric acid, and the sulfuric acid is added at a temperature below 100° C.

4. The process of claim 1 in which from 0.5 part to 5 parts of hypophosphorus acid per 100 parts of hydrazine sulfate is present before the addition of the thiocyanate.

5. The process of claim 1 in which the thiocyanate added is ammonium thiocyanate.

6. A process for the production of 2-amino-5-mercapto-1,3,4-thiadiazole which comprises admixing from ¼ to 1 mol of an alkali metal hydroxide with an aqueous slurry of hydrazine sulfate, and to the reaction mixture adding at least about a stoichiometric amount of a soluble thiocyanate selected from the group consisting of ammonium thiocyanate, sodium thiocyanate and potassium thiocyanate, then adding at least one mol of sulfuric acid per mol of said alkali metal hydroxide, separating the thus formed N,N'-bis-(thiocarbamyl)-hydrazine, adding without drying 1- to 12-normal hydrochloric acid and heating until 2-amino-5-mercapto-1,3,4-thiadiazole is formed.

7. A process for the production of N,N'-bis-(thiocarbamyl)-hydrazine which comprises admixing an alkali metal hydroxide with an aqueous slurry of hydrazine sulfate in the proportions ¼ to 1 mol of alkali metal hydroxide per mol of hydrazine sulfate, adding at least a stoichiometric amount of ammonium thiocyanate, in the presence of from 0.5 to 5 parts of hypophosphorous acid per 100 parts of hydrazine sulfate, then adding at least about 1 mol of sulfuric acid per mol of said alkali metal hydroxide and separating the thus formed N,N'-bis-(thiocarbamyl)-hydrazine.

References Cited in the file of this patent

UNITED STATES PATENTS

| | | |
|---|---|---|
| 2,450,406 | Bambas | Oct. 5, 1948 |
| 2,646,447 | Paterson | July 21, 1953 |
| 2,710,243 | Swimmer | June 7, 1955 |

OTHER REFERENCES

Freund and Others, Beilstein (Handbuch, 4th. ed.), vol. 3, pp. 196–7 (1921).

Ohta et al.: Chem. Abstracts, vol. 47, col. 9323 (1953).

Bambas: "Heterocyclic Compounds" (Interscience), pp. 143–150.